(12) United States Patent
Haller et al.

(10) Patent No.: US 9,027,899 B2
(45) Date of Patent: May 12, 2015

(54) VEHICLE SEAT AND USE OF AN UNDULATING SLIDE ROD ELEMENT

(71) Applicant: Grammer AG, Amberg (DE)

(72) Inventors: Erwin Haller, Birgland (DE); Jens Kolb, Koenigstein (DE)

(73) Assignee: Grammer AG, Amberg (DE)

( * ) Notice: Subject to any disclaimer, the term of this patent is extended or adjusted under 35 U.S.C. 154(b) by 28 days.

(21) Appl. No.: 13/738,643

(22) Filed: Jan. 10, 2013

(65) Prior Publication Data

US 2013/0181494 A1    Jul. 18, 2013

(30) Foreign Application Priority Data

Jan. 13, 2012  (DE) .......................... 10 2012 100 287

(51) Int. Cl.
*F16M 13/00* (2006.01)
*B60N 2/07* (2006.01)
*B60N 2/075* (2006.01)
*B60N 2/06* (2006.01)
*F16C 29/02* (2006.01)

(52) U.S. Cl.
CPC ............ *B60N 2/0722* (2013.01); *B60N 2/0705* (2013.01); *B60N 2/0715* (2013.01); *B60N 2/075* (2013.01); *F16C 29/02* (2013.01); *B60N 2/06* (2013.01)

(58) Field of Classification Search
USPC .......... 248/424, 429, 430; 297/344.1, 344.11; 384/7, 10, 26, 34, 38, 49, 50, 53, 55, 384/52, 57
See application file for complete search history.

(56) References Cited

U.S. PATENT DOCUMENTS

| 2,737,229 | A |   | 3/1956  | Semar |              |
|-----------|---|---|---------|---------|--------------|
| 3,347,603 | A | * | 10/1967 | Ignatjev | ........................... 384/52 |
| 3,479,099 | A | * | 11/1969 | Krause   | ............... 384/34 |
| 4,109,973 | A | * | 8/1978  | Terada   | ............... 384/57 |
| 4,925,164 | A | * | 5/1990  | Kopich   | ........... 267/167 |

(Continued)

FOREIGN PATENT DOCUMENTS

| DE | 1082138 | 5/1960 |
| DE | 2429019 | 1/1976 |

(Continued)

OTHER PUBLICATIONS

Examination Report prepared by the German Patent Office on Aug. 23, 2012, for Application No. 102012100287.8.

(Continued)

*Primary Examiner* — Terrell McKinnon
*Assistant Examiner* — Michael McDuffie
(74) *Attorney, Agent, or Firm* — Sheridan Ross P.C.

(57) ABSTRACT

The invention relates to a vehicle seat comprising a seat part, comprising a back rest part and comprising a linear guide device for translational adjustment of the vehicle seat, in which the linear guide device comprises a guide rail means and a slide rail means which is displaceable with respect thereto, in which a bearing means interacts between the slide rail means and the guide rail means and at least comprises slide rod elements so as to mount the slide rail means with respect to the guide rail means, and in which the slide rod element comprises an elongate undulating base body, the slide rod element having an effective external diameter which is greater, at least when the slide rod element is radially unloaded, than a core external diameter of the elongate undulating base body.

12 Claims, 3 Drawing Sheets

(56) References Cited

U.S. PATENT DOCUMENTS

| | | | |
|---|---|---|---|
| 5,046,698 A * | 9/1991 | Venier | 248/430 |
| 5,323,998 A * | 6/1994 | Aihara | 248/430 |
| 5,582,381 A | 12/1996 | Graf et al. | |
| 6,264,159 B1 * | 7/2001 | Su | 248/430 |
| 7,594,755 B2 * | 9/2009 | Ropp | 384/34 |
| 8,251,336 B2 * | 8/2012 | Kimura et al. | 248/430 |
| 2001/0013570 A1 * | 8/2001 | Yoshida et al. | 248/429 |
| 2003/0230696 A1 * | 12/2003 | Yamada et al. | 248/424 |
| 2004/0126039 A1 * | 7/2004 | Kashiyama et al. | 384/38 |
| 2008/0193062 A1 * | 8/2008 | Ropp | 384/34 |
| 2010/0243852 A1 * | 9/2010 | Muraishi | 248/429 |
| 2012/0074289 A1 * | 3/2012 | Kimura et al. | 248/430 |

FOREIGN PATENT DOCUMENTS

| | | |
|---|---|---|
| DE | 2715640 | 10/1978 |
| DE | 3030725 | 3/1982 |
| EP | 0685358 | 12/1995 |
| FR | 1281729 | 1/1962 |

OTHER PUBLICATIONS

Search Report for European Patent Application No. 13150954.9, dated May 8, 2013, 3 pages.

Official Action with English Translation for China Patent Application No. 201310010285.2, dated Dec. 29, 2014, 9 pages.

* cited by examiner

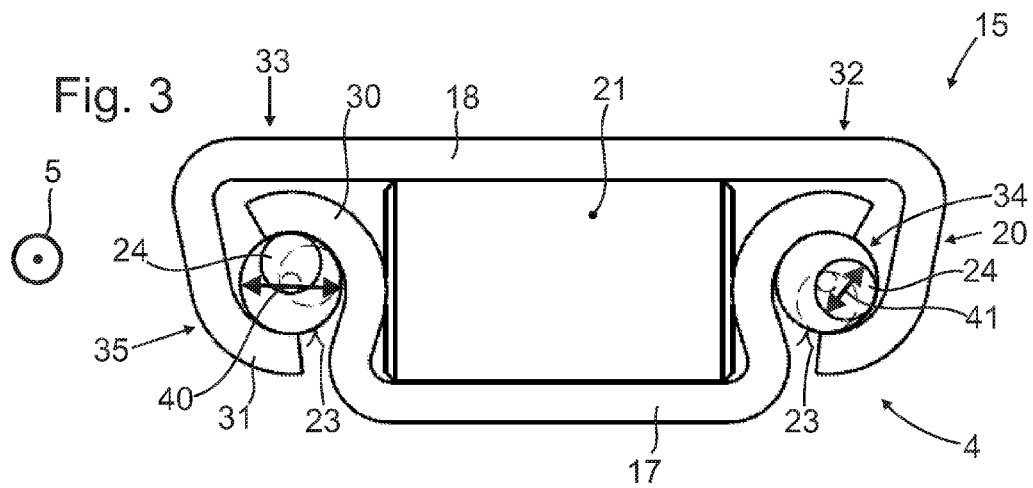
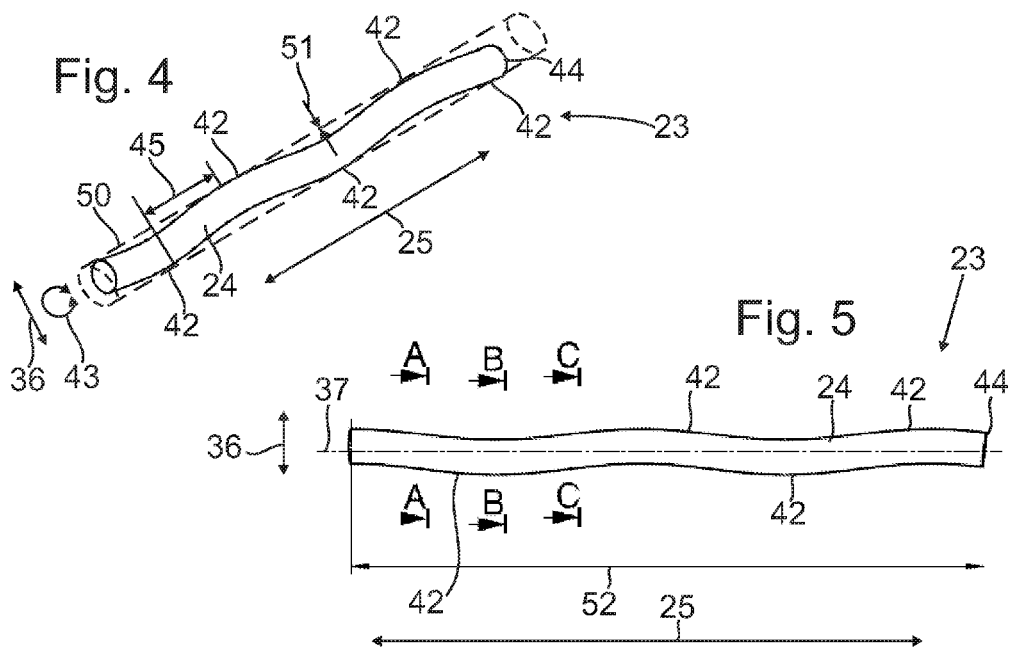
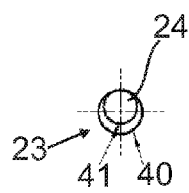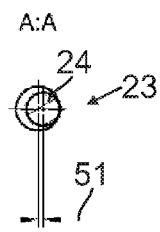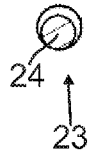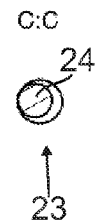

VEHICLE SEAT AND USE OF AN UNDULATING SLIDE ROD ELEMENT

CROSS REFERENCE TO RELATED APPLICATIONS

This application claims the benefit of German Patent Application No. 10 2012 100 287.8 filed Jan. 13, 2012, the disclosures of which is incorporated herein by reference.

The invention relates to a vehicle seat comprising a seat part, comprising a back rest part and comprising a linear guide device for translational adjustment of the vehicle seat, in which the linear guide device comprises a guide rail means and a slide rail means which is displaceable with respect thereto, and in which a bearing means interacts between the slide rail means and the guide rail means and at least comprises slide rod elements so as to mount the slide rail means with respect to the guide rail means.

The invention further relates to a use of an undulating slide rod element.

From the prior art, it is known in the field of vehicle seat construction to hold rail means, which are installed displaceably with respect to one another, of a linear guide device, for translational adjustment of a vehicle seat, spaced apart from one another, by means of bearing means of different configurations, in such a way that ideally the mutually corresponding rail means of a rail pair do not rub directly against one another, so as always to provide easy adjustment of the vehicle seat.

For example, an adjustable vehicle seat for two or more persons is known from patent specification DBP 1 082 138, and comprises a pair of seat adjustment devices, each of the seat adjustment devices comprising a lower and an upper running rail. In this context, the lower running rail is fixed to a body of a vehicle, whilst the upper running rail can slide with respect to the lower running rail in the longitudinal direction thereof. The two running rails are spaced apart from one another by a bearing means, which on the one hand comprises rollers for this purpose, so as to space the two running rails apart from one another. On the other hand, balls of the mounting device are provided, and interact between mutually overlapping edges of the two running rails, in such a way that the two running rails are held with the minimum backlash with respect to one another radially with respect to the longitudinal direction. However, a drawback in this context is that the components of the seat adjustment devices each have to be manufactured to a low tolerance, so as to be able to ensure a reasonably satisfactory low level of backlash, in particular between the two running rails.

A horizontally and vertically adjustable motor vehicle seat is further known from the publication of the application no. DE 24 29 019 A1, in which slide rails are braced against guide rails, corresponding thereto, of a linear guide device, again by means of a roller and ball arrangement, so as to make translational adjustment of the motor vehicle seat possible with minimum backlash. In this case too, low component tolerances are required in view of a sufficiently low level of backlash between the guide rails and the slide rails.

In addition, a slide rail guide for sliding vehicle seats is known from the publication of the application no. DE 27 15 640 A1, in which a guided rail and a guiding rail are mounted displaceably with respect to one another, on the one hand by balls and on the other hand by means of a cord of a resilient material which is guided in a sliding block. By means of the cord of the resilient material, backlash-free guidance is to be provided between the two mutually corresponding rails, even when the slide rail guide is unloaded. However, it is a drawback that the backlash-free condition between the guided and guiding rails can be lost prematurely as a result of material fatigue, especially of the resilient material of the cord.

Moreover, it is known from the prior art also to use slide rod elements, instead of the above-described balls or rollers of a bearing means, so as to mount mutually corresponding rail means displaceably with respect to one another. However, in this context there is the problem that even if there is initially a backlash-free condition, this can again be lost prematurely as a result of wear on the slide rod element.

In principle, it is possible by way of the above-described solutions to mount rail means of linear guides of a vehicle seat virtually without backlash with respect to one another. However, in most solutions relatively complex production is necessary for this purpose so as to produce an acceptable arrangement of the rail means and bearing means components without backlash. In addition, arrangements of this type often fail, in such a way that after a particular duration of use of the vehicle seat, which is much less than the average lifetime of a vehicle, it is no longer possible to ensure cooperation of the rail means without backlash in a satisfactory manner.

Backlash, especially in the linear guide means, often leads in practice to an empty stroke of the slider being perceived as hard strikes in the event of mutual loading within the seat system. In addition, this also acts as an unstable guide system, since a rotational degree of freedom comes about in the system as a whole as a result of the lateral backlash.

The object of the present invention is therefore to develop vehicle seats in such a way that the linear guide devices thereof are constructed so as to have more durable operation as regards backlash-free mounting and in addition so as to be simpler in construction.

The object of the invention is achieved by a vehicle seat comprising a seat part, comprising a back rest part and comprising a linear guide device for translational adjustment of the vehicle seat, in which the linear guide device comprises a guide rail means and a slide rail means which is displaceable with respect thereto, in which a bearing means interacts between the slide rail means and the guide rail means and at least comprises slide rod elements so as to mount the slide rail means with respect to the guide rail means, and in which the slide rod element comprises an elongate undulating base body, the slide rod element having an effective external diameter which is greater, at least when the slide rod element is radially unloaded, than a core external diameter of the elongate undulating base body.

As a result of the slide rod element configured in this manner, or the base body thereof, an extremely durable backlash-free mounting is achieved with an extremely simple construction, especially between the two rail means, since this slide rod element can only enter operational contact with the two rail means in regions.

Thus, a springing and/or damping element between the slide rail means and the guide rail means is available for a much longer period so as to ensure a particularly durable backlash-free mounting, in particular radially. In addition, the slide rail means can slide much more easily as a result of the operational contact in regions.

Particularly the risk of undesired jamming of the arrangement of the guide rail means, slide rail means and slide rod element can be completely avoided for the first time, since the present undulating slide rod element can spring radially, as is explained in greater detail in the following.

Thus, vehicle seats can advantageously be displaced with respect to the longitudinal and/or lateral adjustment means or with respect to the horizontal spring means thereof.

Moreover, different rod diameters can be dispensed with, so as to even out manufacturing tolerances with respect to the guide rail means and the slide rail means, and as a result the mounting complexity is greatly reduced. Advantageously, tolerance compensation, for which different rod diameters were previously always necessary, can be achieved in this way.

Within the meaning of the invention, the "effective external diameter" is represented by radially outer generated surface regions of the base body of the slide rod element as by radially inner generated surface regions of the base body.

Within the meaning of the invention, the "core diameter" is distinguished by the actual material cross-section of the base body of the slide rod element.

A particularly high stability of the slide rod element can be ensured if the base body has a core diameter between 2 mm and 15 mm. In this embodiment a core diameter of 4.85 mm is selected.

In spite of the undulating base body of the slide rod element, the present slide rod element has virtually the same load capacity as a straight slide rod element.

Thus, the radially outer generated surface regions form undulation peaks and the radially inner generated surface regions form corresponding undulation troughs on the peripheral surface of the slide rod element, which are arranged alternately along the longitudinal extent of the slide rod element. In this context, the wave peaks represent the actual sliding guidance points of the slide rod elements.

The term "guide rod means" describes a rail means which is substantially fixed or ideally mounted stationary on a body of a vehicle and on which the slide rail means is guided in a translational manner. Advantageously, the guide rail means may also be formed from a component on the body side, in such a way that a separate rail means component for this purpose can be dispensed with.

Thus, the term "slide rail means" basically describes a rail means which is guided on the guide rail means. It is preferably fixed to the vehicle seat or to a vehicle seat undercarriage or even formed thereby. In the latter variant, a separate slide means component can again advantageously be dispensed with.

The term "radial" describes an operational direction on the linear guide means which extends substantially transverse to the longitudinal extent of the linear guide means, in particular of the guide rail means or the slide rail means.

In the present case, separate or individual rail means can advantageously be dispensed with, since the rail means can be manufactured with a lower tolerance as a result of the slide rod element according to the invention, in such a way that they can also be implemented by way of other functional components, on which lesser requirements are placed as regards manufacturing tolerances.

It is thus also advantageous for the guide rail means and/or the slide rail means respectively to be formed by at least one functional component of the vehicle seat.

In connection with the present invention, for the terms "guide rail means" and "slide rail means", reference is generally also made to rail means for simplicity. The rail means may advantageously be produced from profile-rolled sheet metal parts.

In this context, the rail means may be configured in virtually any manner, so long as they are arranged mutually interacting in such a way that together they form a reliably operating receiving space in which at least one slide rod element can be arranged along the rail means.

For this purpose, corresponding end face regions of the guide rail means and the slide rail means, which extend in the longitudinal extent of the rail means in each case, are advantageously made c-profile-shaped, in such a way that both the guide rail means and the slide rail means engage around the respective slide rod element at least in part.

In this context, a maximum vertical backlash of 0.6 mm and a maximum lateral backlash of 0.8 mm are advantageously provided between the two mutually corresponding rail means, even with an extremely long period of use. A vertical backlash or lateral backlash which is this low can be considered virtually negligibly small in relation to a vehicle seat and virtually without backlash within the meaning of the invention.

It goes without saying that the slide rod element can also be formed by different base bodies. Ideally, it comprises an elongate base body having a substantially round material cross-section.

Unlike the slide rail guide from DE 27 15 640 A1, which was mentioned at the outset, in the present case, according to the invention, backlash-free mounting of the slide rail means on the guide rail means can be achieved as a result of the shape of the slide rod element, and not as a result of the material selection of the cord.

Thus, the slide rod element used herein is not distinguished by a resilient material, such as an elastomer. Instead, the present slide rod element ideally consists of a harder plastics material, such as a thermoplastic, and as a result it can also be produced by a very simple method. However, thermosets could also be used, although they have more brittle material properties and are thus more susceptible to strikes and impacts.

If the slide rod element is surface-coated with Teflon, the slide rod element may advantageously be formed with a particularly wear-resistant generated surface. Moreover, particularly good sliding properties can also be achieved with a Teflon coating of this type, and in this way vehicle seat adjustment can be carried out with less force.

Optionally, the base body of the present slide rod element may also be made of a metal or the like if it has a friction-reducing Teflon coating.

In any case, by means of an appropriate material selection in relation to the base body, damping properties of the slide rod element can advantageously be set in a cumulative manner. This is advantageous with respect to different primary fields of use of the vehicle seat, for example in relation to a commercial vehicle or passenger vehicle. Thus, especially as a result of the undulating base body of the present slide rod element, a radially acting damping means can advantageously be provided between the two rail means of the linear guide device of the vehicle seat.

In this context, a preferred variant configuration provides that the slide rod element comprises a radial coil spring element. In this way in particular, it can be ensured with a simple construction that the slide rod element undulates in the direction of the longitudinal extent thereof and thus is also formed with a plurality of curves in such a way that the generated surface thereof only comes into contact with the guide rail means and the slide rail means in regions.

Advantageously, the present slide rod element has a pitch of more than 5 mm, preferably more than 10 mm, and less than 50 mm, preferably less than 20 mm, between the individual radially outer generated surface regions. As a result, it can be provided that a sufficiently large number of radially outer generated surface regions of this type are provided on the slide rod element so as to achieve the desired functionality.

Within the meaning of the invention, the term "pitch" refers to a helical pitch with spacing between two most closely adjacent radially outer generated surface regions, irrespective of where these two most closely adjacent radially outer generated surface regions are located on the periphery of the slide rod element. In this context, the spacing is measured substantially parallel to and in the direction of the longitudinal extent of the slide rod element.

The helical pitch, which can be controlled as a parameter, determines the number of sliding guidance points or the spring force/spring rate which acts in the radial direction after installation.

Advantageously, the slide rod element is formed with spiral twisting along the longitudinal extent thereof. As a result, the slide rod element according to the invention can be produced in a particularly simple manner.

Advantageously, by means of an in particular screw-shaped slide rod element, on the one hand a particularly durable backlash-free bearing means can be provided, and on the other hand a good damping means can be provided cumulatively.

It is further advantageous if the slide rod element comprises a plurality of radial elevations on the periphery thereof, and the radial elevations are arranged in the peripheral direction in such a way that the slide rod element can only come into operational contact with the rail means at points.

Thus, a further advantageous variant embodiment provides that the slide rod element, at least when radially unloaded, is in operational contact radially, along the longitudinal extent thereof, with the guide rail means and/or the slide rail means only at points.

As a result, the present slide rod element differs from conventional slide rod elements, since they are in operational contact with the slide means at least along lines, in particular in the direction of the longitudinal extent thereof. However, as a result in particular the spring properties of the present slide rod element cannot be achieved, or can only be achieved to an insufficient extent.

It is further advantageous if the slide rod element forms an envelope, which encloses a three-dimensional volume along the longitudinal extent of the slide rod element which is larger than a three-dimensional volume comprised by the slide rod element. Within the meaning of the invention, the envelope is defined by means of the radially outer generated surface regions of the slide rod element.

Especially as a result of the undulating base body of the present slide rod element, a radially acting spring means can also advantageously be provided between the two rail means of the linear guide device of the vehicle seat, in such a way that a particularly durable backlash-free condition can be ensured between the guide rail means and the slide rail means.

It is particularly advantageous if the slide rod element has a radial spring excursion of more than 0.3 mm, preferably more than 0.5 mm, and less than 5 mm, preferably less than 1.5 mm, ideally less than 0.75 mm. By way of a radial spring excursion of this type, an unusually durable backlash-free condition can be ensured.

It is further advantageous if the slide rod element is arranged radially biased between the guide rail means and the slide rail means in such a way that the slide rail means is arranged mounted backlash-free with respect to the guide rail means.

Advantageous mounting in particular of the present slide rod element between the two rail means can be achieved with a simple construction if the slide rod element comprises a base body which has a substantially uniform material cross-section along the longitudinal extent of the slide rod element, the base body being arranged eccentrically from the central axis of the slide rod element in regions.

So as to be durably able to transfer relatively large forces acting between the slide rail means and the guide rail means, it is advantageous if the bearing means comprises roller body elements.

In relation to a further aspect of the invention, the present object is also achieved by a use of an undulating slide rod element for backlash-free mounting two guide rails of a linear guide device of a vehicle seat, which are mounted displaceably with respect to one another. Advantageously, a simply undulating slide rod element can be used as a mounting element for mounting a slide rail means and a guide rail means of the linear guide means of the vehicle seat backlash-free.

Further advantages, aims and properties of the present invention are described by way of the appending drawings and the following description, which show and describe by way of example a vehicle seat which comprises in particular a linear guide device comprising a guide rail means, comprising a slide rail means and comprising a bearing means, which has at least one undulating slide rod element, for holding the guide rail means and the slide rail means spaced apart from one another. In the drawings:

FIG. 3 is a schematic sketch front view of one of the rail means pairs of the linear guide means of the vehicle seat from FIGS. 1 and 2;

FIG. 4 is a schematic perspective view of the undulating slide rod element of the linear guide means of the vehicle seat from FIGS. 1 to 3;

FIG. 5 is a schematic side view of the undulating slide rod element of the linear guide means of the vehicle seat from FIGS. 1 to 4;

FIG. 6 is a schematic front view of the undulating slide rod element of the linear guide means of the vehicle seat from FIGS. 1 to 5 having a recognisable core external diameter and effective external diameter;

FIG. 7 is a schematic sectional view along the section line A-A of the undulating slide rod element of the linear guide means of the vehicle seat from FIGS. 1 to 6;

FIG. 8 is a schematic sectional view along the section line B-B of the undulating slide rod element of the linear guide means of the vehicle seat from FIGS. 1 to 7; and FIG. 9 is a schematic sectional view along the section line C-C of the undulating slide rod element of the linear guide means of the vehicle seat from FIGS. 1 to 8.

Figure 1:
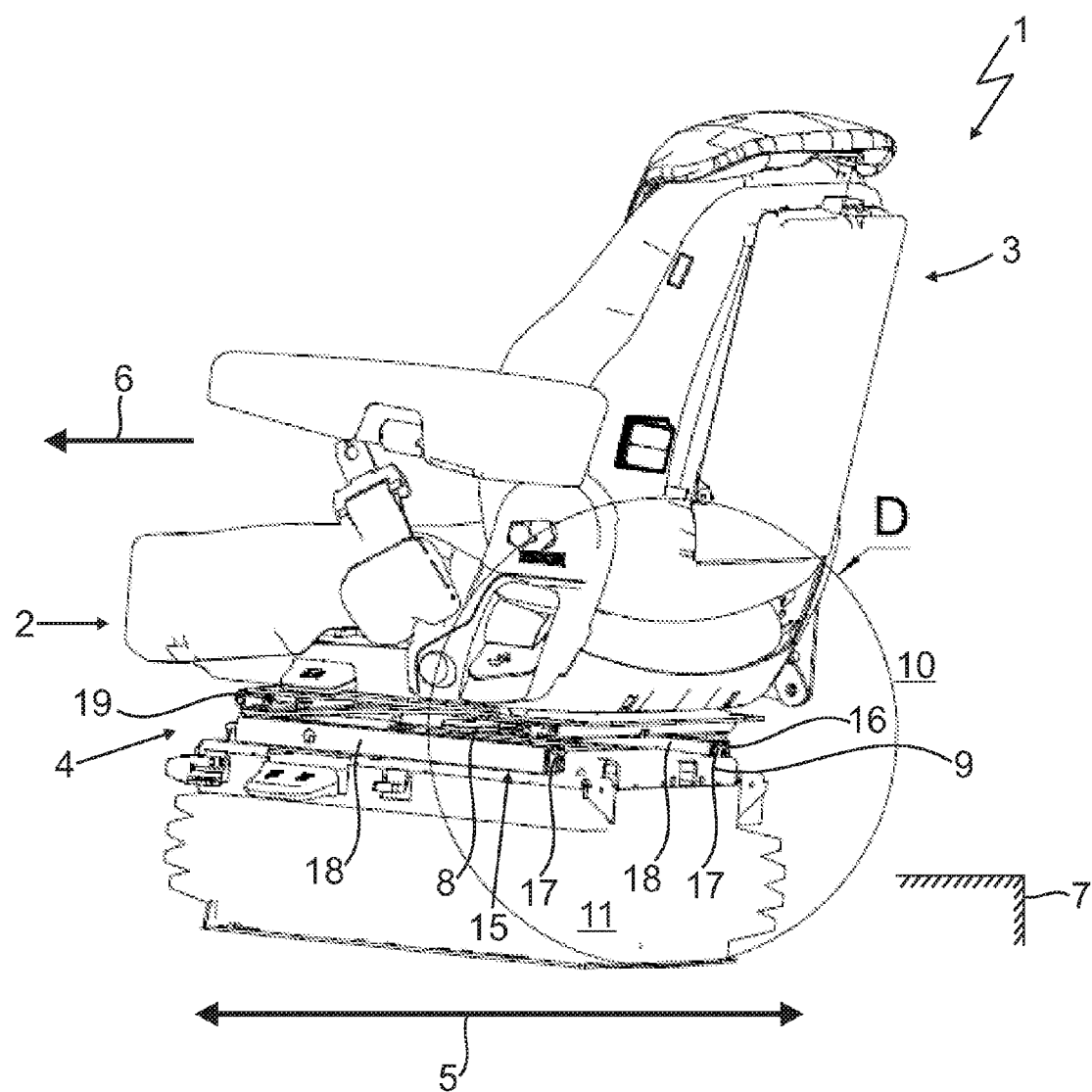
FIG. 1 is a schematic side-rear view of a vehicle seat which comprises a linear guide device comprising two rail guide pairs, each consisting of a guide rail means, a slide rail means and a bearing means, which has at least one undulating slide rod element, for holding the guide rail means and the slide rail means spaced apart from one another.
Figure 2:
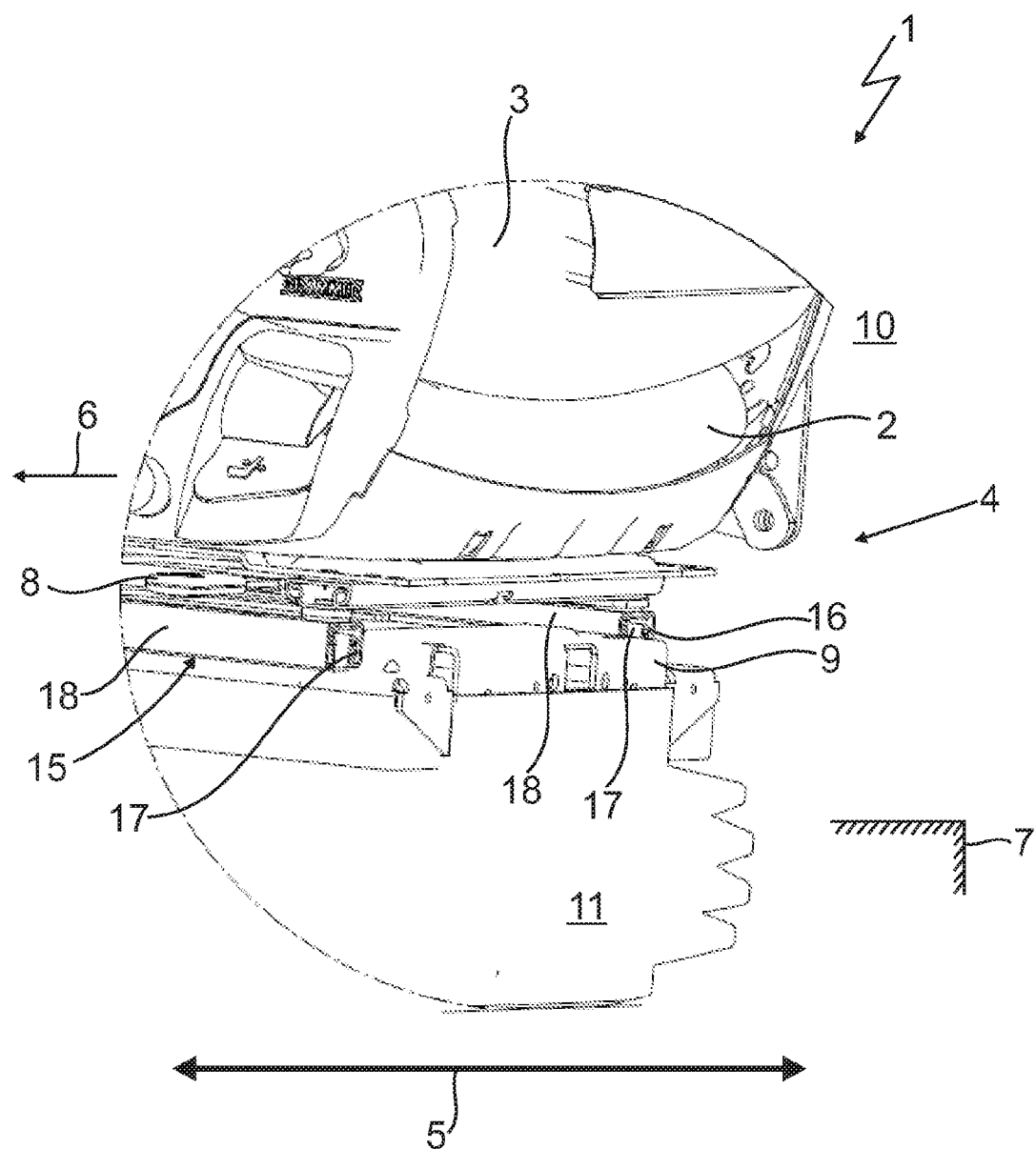
FIG. 2 is a schematic detail of the linear guide means of the vehicle seat from FIG. 1.

The vehicle seat 1 shown in FIGS. 1 and 2 basically comprises a seat part 2, a back rest part 3 and a linear guide means 4, by means of which the vehicle seat 1 can be adjusted forwards in a translational manner in the longitudinal direction 5 with respect to a forwards travel direction 6 of a vehicle 7 (not shown in greater detail), and back counter to said forwards travel direction 6, when an operating lever 8 is actuated accordingly to unlock a locking means (not shown) of the linear guide means 4.

The linear guide device 4 is fixed to a body-side springing and damping bracket 11 at the upper side 10 by means of a mounting unit 9.

Among other things, the linear guide means 4 comprises two rail means pairs 15 and 16, which ensure the translational adjustment of the vehicle seat 1 with respect to the body-side springing and damping bracket 11.

As can be seen clearly in particular from the drawing of FIG. 3, each of the rail means pairs 15 and 16 respectively comprises a guide rail means 17 (only numbered herein by way of example) and a slide rail means 18 (also only numbered herein by way of example) which is displaceable with respect thereto.

The guide rail means 17 are fixed stationary on the body-side springing and damping bracket 11 by way of the mounting unit 9. The slide rail means 18 are accordingly fixed stationary on a vehicle seat frame 19 which is placed below the seat part 2.

Moreover, with respect to each rail means pair 15 or 16, the linear guide means 4 comprises a bearing means 20 in each case (see FIG. 3), which comprises on the one hand commercially conventional roller body elements 21 in the form of cylinder roller bearings 21 and on the other hand slide rod elements 23 according to the invention each comprising an elongate undulating base body 24. Accordingly, the slide rod elements 23 also undulate in the direction of the longitudinal extent 25 thereof.

The cylinder roller bearings 21 brace the guide rail means 17 and the slide rail means 18 against one another in such a way that the slide rail means 18 can be displaced in a translational manner with respect to the guide rail means 17 along the longitudinal direction 5.

The slide rail means 18 is substantially laterally radially enclosed by the guide rail means 17. In this context, the guide rail means 17 and the slide rail means 18 are profile-rolled in such a way that, on the respective end face regions 30 and 31 thereof (only numbered herein by way of example) which extend in the longitudinal direction 5, both on a right-hand rail means pair side 32 and on a left-hand rail means pair side 33, a receiving space 34 or 35 for receiving a slide rod element 23 is formed in each case.

By inserting the undulating slide rod elements 23, the guide rail means 17 and the slide rail means 18, in cooperation with the cylinder roller bearings 21, are biased radially 36 (see in particular FIGS. 4 and 5) with respect to one another without backlash.

In this context, the operational direction radial 36 relates to the central axis 37, extending in the longitudinal extent 25, of the slide rod element 23.

As can be seen clearly simply from the drawing of FIG. 3, according to the invention the undulating base body 24 has an effective external diameter 40 which is larger, at least when the slide rod element 23 is radially 36 unloaded, than a core external diameter 41 of the undulating base body 24.

As a result, very good spring properties on the one hand and likewise good damping properties on the other hand are inherent to the slide rod element 23.

Moreover, as a result of the undulating form of the base body 24, a durable and good backlash-free mounting of the slide rail means 18 on the guide rail means 17 and vice versa is achieved with a simple construction.

Moreover, the frictional resistance between the slide rod element 23 and the guide rail means 17 and slide rail means 18 is greatly reduced, since the slide rod element 23 now only interacts with the guide rail means 17 and slide rail means 18 in regions or ideally at points. Thus, lower adjustment forces need to be applied for adjusting the vehicle seat.

The sliding properties of the slide rod element 23 with respect to the guide rail means 17 and slide rail means 18 can be improved further in that the slide rod element 23 is surface-coated with Teflon.

The slide rod element 23 is formed with spiral twisting along a longitudinal extent 25 thereof, in such a way that radially 36 outer generated surface regions 42 are arranged not only distributed in the longitudinal extent 25 of the slide rod element 23 but also with respect to the peripheral extent 43. This can also be seen very clearly from the drawing of FIG. 3, in which the radially 36 outer generated surface regions 42 are each represented by the smaller core external diameter 41 in various positions both on the right-hand and on the left-hand rail means pair side 32 and 33, also represented by the dashed circular line. Thus, under normal load conditions too, only the outer generated surface regions 42 of the slide rod element 23 come into operational contact with the guide rail means 17 and slide rail means 18, respectively.

Thus, the slide rod element 23 is formed as a radial coil spring element 44 having a pitch of 10 mm, the present pitch being represented, within the meaning of the invention, by a spacing 45 (see FIG. 4) between two most closely adjacent radially 36 outer generated surface regions 42.

As a result of the radially 36 outer generated surface regions 42, the undulating slide rod element 23 defines an envelope 50 (see FIG. 4), which encloses a three-dimensional volume along the longitudinal extent 25 of the slide rod element 23 which is larger than a three-dimensional volume comprised by the slide rod element 23. As a result, in this embodiment a radial spring excursion 51 of 0.75 mm can be achieved with a simple construction.

In this embodiment, the slide rod element 23 has a length 52 of 87.5 mm.

The drawings of FIGS. 5 to 9 additionally further show the slide rod element 23 in a side view (FIG. 5), in a front view (FIG. 6) and in various cross-sectional views (FIGS. 7 to 9) along the section lines A-A, B-B and C-C. Since the drawings are also self-explanatory from the above descriptions, and so as to avoid repetitions, they will not be commented on explicitly.

It goes without saying that the above-mentioned embodiment is merely a first configuration of the vehicle seat according to the invention which comprises a slide rod element comprising an undulating base body. Thus, the configuration of the invention is not limited to this first embodiment.

All of the features disclosed in the application documents are claimed as essential to the invention if they are novel, individually or in combination, over the prior art.

LIST OF REFERENCE NUMERALS 1 vehicle seat
2 seat part
3 back rest part
4 linear guide means
5 longitudinal direction
6 forwards travel direction
7 vehicle
8 operating lever
9 mounting unit
10 upper side
11 body-side springing and damping bracket
15 first rail means pair
16 second rail means pair
17 guide rail means
18 slide rail means
19 vehicle seat frame
20 bearing means
21 roller body elements
23 slide rod elements
24 undulating base body
25 longitudinal extent
30 end face regions of the guide rail means
31 end face regions of the slide rail means 32 right-hand rail means pair side
33 left-hand rail means pair side
34 right-hand receiving space
35 left-hand receiving space
36 radial
37 central axis
40 effective external diameter
41 core external diameter
42 outer generated surface regions
43 peripheral extent
44 radial coil spring element
45 spacing
50 envelope
51 radial spring excursion
52 length

The invention claimed is:

1. A vehicle seat comprising:
a seat part, the seat part including:
a back rest part; and
a linear guide device for translational adjustment of the vehicle seat, in which the linear guide device includes a guide rail and a slide rail which is displaceable with respect thereto, in which a bearing interacts between the slide rail and the guide rail, wherein the bearing includes slide rod elements so as to mount the slide rail with respect to the guide rail, characterised in that
the slide rod element comprises an elongate undulating base body, the slide rod element having an effective external diameter, represented by radially outer generated surface regions of the base body of the slide rod element and by radially inner generated surface regions of the base body, which is greater, at least when the slide rod element is radially unloaded, than a core external diameter, which is the actual material cross-section of the base body of the slide rod element, of the elongate undulating base body.

2. The vehicle seat according to claim 1, wherein the slide rod element comprises a radial coil spring element.

3. The vehicle seat according to claim 1, wherein the slide rod element is formed with spiral twisting along the longitudinal extent thereof.

4. The vehicle seat according to claim 1, wherein the slide rod element is surface-coated with Teflon.

5. The vehicle seat according to claim 1, wherein the slide rod element, at least when radially unloaded, is in operational contact radially, along the longitudinal extent thereof, with the guide rail means and/or with the slide rail only at points.

6. The vehicle seat according to claim 1, wherein the slide rod element forms an envelope, which encloses a three-dimensional volume along the longitudinal extent of the slide rod element which is larger than a three-dimensional volume comprised by the slide rod element.

7. The vehicle seat according to claim 1, wherein the slide rod element has a radial spring excursion of more than 0.3 mm, preferably more than 0.5 mm, and less than 5 mm, preferably less than 1.5 mm, ideally less than 0.75 mm.

8. The vehicle seat according to claim 1, wherein the bearing comprises roller body elements.

9. The vehicle seat according to claim 1, wherein the guide rail means and/or the slide rail are respectively formed by at least one functional component of the vehicle seat.

10. The vehicle seat according to claim 1, wherein the slide rod element is arranged radially biased between the guide rail and the slide rail in such a way that the slide rail is arranged mounted without backlash with respect to the guide rail.

11. Use of an undulating slide rod element for mounting without backlash two guide rails of a linear guide device of a vehicle seat, which are mounted displaceably with respect to one another.

12. A vehicle seat, comprising:
a seat part, including a back rest part; and
a linear guide device for translational adjustment of the vehicle seat, in which the linear guide device comprises a guide rail and a slide rail which is displaceable with respect thereto, in which a bearing interacts between the slide rail and the guide rail and at least includes slide rod elements so as to mount the slide rail with respect to the guide rail, characterised in that
the slide rod element comprises an elongate undulating base body, the slide rod element having an effective external diameter, represented by radially outer generated surface regions of the base body of the slide rod element and by radially inner generated surface regions of the base body, which is greater, at least when the slide rod element is radially unloaded, than a core external diameter, which is the actual material cross-section of the base body of the slide rod element, of the elongate undulating base body,
wherein the radially outer generated surface regions represent the actual sliding guidance points of the slide rod elements.

* * * * *